United States Patent [19]

Hayashimoto et al.

[11] Patent Number: 4,634,884
[45] Date of Patent: Jan. 6, 1987

[54] SWING-DRIVEN SOLID-STATE IMAGE SENSOR

[75] Inventors: Yoshiaki Hayashimoto, Yokohama; Chiaki Tanuma, Tokyo; Katsunori Yokoyama, Ebina; Nozomu Harada, Yokohama, all of Japan

[73] Assignee: Kabushiki Kaisha Toshiba, Kawasaki, Japan

[21] Appl. No.: 629,562

[22] Filed: Jul. 10, 1984

[30] Foreign Application Priority Data

Jul. 12, 1983 [JP] Japan ................... 58-126676

[51] Int. Cl.⁴ ............................................ H01J 40/14
[52] U.S. Cl. ................................. 250/578; 358/213
[58] Field of Search ............... 250/578; 358/212, 213

[56] References Cited

U.S. PATENT DOCUMENTS 4,543,601 9/1985 Harada et al. ............... 358/213
4,554,586 11/1985 Tanama et al. ............... 358/213

OTHER PUBLICATIONS

Translation of Japanese Kokai Patent Publication No. 53-101939, published Sep. 5, 1978, inventor Ejirij, assignee, Riko Co., Ltd.

Primary Examiner—David C. Nelms
Assistant Examiner—L. W. Madoo
Attorney, Agent, or Firm—Oblon, Fisher, Spivak, McClelland, & Maier

[57] ABSTRACT

According to an image pickup device, a swing-driver unit is provided for vibrating an image sensor unit, thereby causing the image sensor unit to perform an image pickup operation in such a manner as to periodically shift to different sampling positions at different time points in one frame period. The swing-driver comprises a pair of plate-like bimorph piezoelectric elements for stably supporting the image sensor unit. The image sensor unit and the piezoelectric elements are sealed in a ceramic frame body in a compact manner. The electrical connection between the image sensor unit and lead wires formed on the frame is performed by a flexible film connector. The electrical connection between the piezoelectric elements and the lead wires is performed by wiring patterns preformed on the frame.

7 Claims, 3 Drawing Figures

SWING-DRIVEN SOLID-STATE IMAGE SENSOR

BACKGROUND OF THE INVENTION

The present invention relates in general to a solid-state image sensing device and, in more particular, to a swing-driven solid-state image sensor which vibrates relative to incoming image light to increase the number of sampling points in one frame image, which contributes to an improvement in the resolution of the image sensor.

An easy method for obtaining high resolution of a picked-up image in a conventional solid-state image sensor such as an interline transfer type CCD (to be referred to as an IT-CCD hereinafter), in accordance with the interlacing image pickup technique, is to increase the number of pixels. However, even a conventional IT-CCD having a standard number of pixels has a larger chip size than many LSIs. When the number of pixels in such a CCD is increased to satisfy the need gor higher resolution without increasing the packing density, the chip size thereof becomes larger. In addition, when the number of pixels is increased while the conventional CCD chip size is kept unchanged, the packing density of the pixels must be enhanced greatly (e.g., more than four times). It is technically difficult to prepare such a high-density CCD. Even if development of improved fabrication techniques allows the manufacture of such a CCD in the near future, the circuit configuration for driving such a CCD is complicated and power consumption is high, thus entailing new problems.

In order to solve the problem concerning the number of pixels vs. packing density, the CCD is periodically displaced relative to incident image light, thereby picking up a high-resolution image. In two field periods constituting one frame period in the NTSC system, when the CCD is swung at an amplitude corresponding to ½ the pixel pitch such that pixels are positioned in different sampling positions along a horizontal direction, the apparent number of spatial sampling points along the horizontal direction can be doubled. Therefore, the horizontal resolution of the one-frame image can be substantially doubled even if a conventional low-resolution IT-CCD chip is used.

According to a solid-state image sensing device for performing the aforementioned swing image pickup, a mechanism must be held together with the IT-CCD chip in a single package unit to effectively swing the IT-CCD chip in a desired vibration mode. Piezoelectric elements such as bimorph piezoelectric elements are used to minimize the vibration loss of CCD chips having a larger chip size than the conventional LSI chips and to generate a maximum effective vibration. However, it is difficult to pack the piezoelectric elements and their electrical connections together with the CCD chip in a single device. This is because when the common lead wire connection or normal film connector is used to electrically bias the piezoelectric elements subjected to mechanism vibrations, the connection decisively limits the vibration of the piezoelectric elements.

SUMMARY OF THE INVENTION

It is therefore an object of the present invention to provide a new and improved swing-driven solid-state image pickup device wherein a vibration generator unit for vibrating or swinging a single image sensor chip is properly packed together with the chip, and the vibration generator unit can provide a stable, effective, prescribed vibration mode.

According to such an image pickup device, a solid-state image sensor unit receives incoming image light and produces an electrical image pickup signal corresponding to the incoming image light. The swing-driver unit is provided for vibrating the image sensor unit on a plane substantially perpendicular to the image light, and for causing the image sensor unit to perform the image pickup operation in such a manner as to periodically shift to different sampling positions at different time points in one frame period. The swing-driver comprises a pair of plate-like piezoelectric elements which oppose each other and stably support the image sensor unit on opposing sides of the piezoelectric elements. The image sensor unit and the piezoelectric elements are sealed in a housing or packaging unit. The packaging unit comprises an electrically insulative rectangular frame body, an electrically conductive elastic support unit, and sealing plates. The frame body has a lead terminal block including first lead terminals for transferring input/output signals with respect to the image sensor unit and second lead terminals for receiving a power supply voltage for driving the piezoelectric elements. The frame body has an open top, an open bottom and opposing wall portions which have two pairs of slits. A wiring pattern extends to electrically connect the two pairs of slits and the second lead terminals. The elastic support units are respectively mounted so as to be electrically connected to the pair of piezoelectric elements. The two ends of each of elastic support units are fitted in the corresponding pair of slits, thereby elastically mounting the piezoelectric elements in the frame body. Therefore, the piezoelectric elements can swing with a minimum vibration loss. The sealing plates are tightly fixed on the openings of the frame body so as to seal the image sensor unit and the piezoelectric elements in the frame body.

BRIEF DESCRIPTION OF THE DRAWINGS

The present invention is best understood by reference to the accompanying drawings, in which.

DETAILED DESCRIPTION OF THE PREFERRED EMBODIMENT

Figure 1:
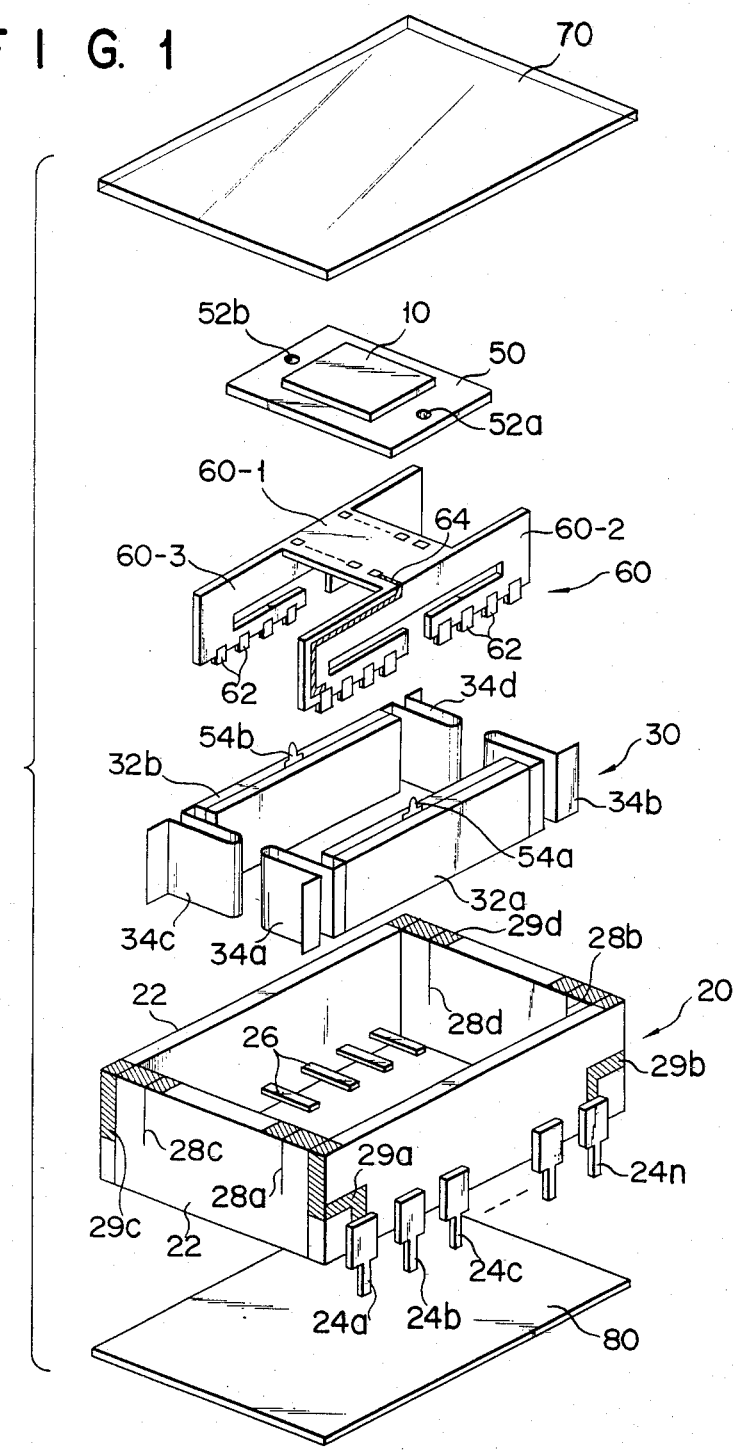
FIG. 1 is an exploded perspective view illustrating the overall construction of an image sensing device for obtaining a high-quality image having a larger number of pixels than the actual number of pixels of the CCD and two vibrators which vibrate a CCD chip relative to image light according to an embodiment of the present invention.

Referring now to FIG. 1, there is illustrated an exploded perspective view of an image sensing device incorporating an area solid-state charge-coupled device (CCD) 10 operated in accordance with what is called the swinging image pickup technique. In this image sensing device, an electrically insulative frame 20 comprises four ceramic plates 22 to constitute a rectangular frame assembly having an open top and an open bottom. The frame 20 serves as a package main body. Lead terminals 24a, 24b, 24c, ..., and 24n (the lead terminals formed on the opposing outer wall surface are not seen in FIG. 1) are formed on an illustrated outer wall surface of the frame body 20. The lead terminals 24 are mounted on the ceramic frame 20 to have a standard IC pitch so that the terminals can be attached to a known component (not shown) such as a printed wiring board or an LSI socket. Pin lead terminals 26 extend normal to the inner wall surface of two of the ceramic plates 22 of the frame body 20 so as to correspond to the lead terminals 24. The pin leads 26 are arranged to be electrically connected with the CCD chip unit 10.

Slits 28a and 28c and slits 28b and 28d are respectively formed in the two opposing ceramic plates 22 not having the lead terminals 24 and 26 thereon. These slits 28 are precisely formed by laser cutting after the frame 20 has been assembled from the four ceramic plates. The opposing slits 28a and 28b (or 28c and 28d) are optically aligned with high precision. Thin conductive wiring patterns 29a, 29b, 29c and 29d are formed to include the edges of the ceramic plates 22 which have the slits 28 thereon, respectively. The first conductive wiring pattern 29a is metallized on the surfaces of the corresponding ceramic plates 22 to connect the slit 28a with the leftmost lead terminal 24a. The second wiring pattern 29b is metallized on the surfaces of the corresponding ceramic plates 22 to connect the slit 28b with the rightmost lead terminal 24n. The above arrangement can also be applied to the other wiring patterns 29c and 29d.

Referring to FIG. 1, reference numeral 30 denotes a vibration unit for mechanically vibrating the CCD unit 10 in the image sensing mode. The unit 30 includes a pair of vibration plates 32a and 32b. Each vibrator 32a, 32b comprises a couple of piezoelectric vibrating elements such as bimorph piezoelectric elements which are adhered to each other.

The vibrators 32a and 32b are mounted in the hollow ceramic frame 20 to minimize the vibration loss through conductive elastic spring plates 34a to 34d. The conductive elastic spring plates 34a and 34b having a U-shaped portion are each mounted at the two ends of the vibrator 32a. The elastic spring plates 34c and 34d are mounted at the two ends of the vibrator 32b in the same manner as described above. The vibrator 32a with the spring plates 34a and 34b attached thereto is mounted in the ceramic frame 20 such that the ends of the spring plates 34a and 34b are firmly fitted in the slits 28a and 28b, respectively. The spring plate 34a (or 34b) is mechanically fixed by a known technique (e.g., soldering) at the thin metal wiring pattern 29a (or 29b) formed around the corresponding slit of the frame 20 and is also electrically connected to the corresponding lead terminal 24a (or 24f). The vibrator 32b having the spring plates 34c and 34d has the same arrangement as described above. It should be particularly noted that the spring plates 34 also serve as electrodes for supplying the necessary power to the bimorph piezoelectric vibrator.

Figure 2:
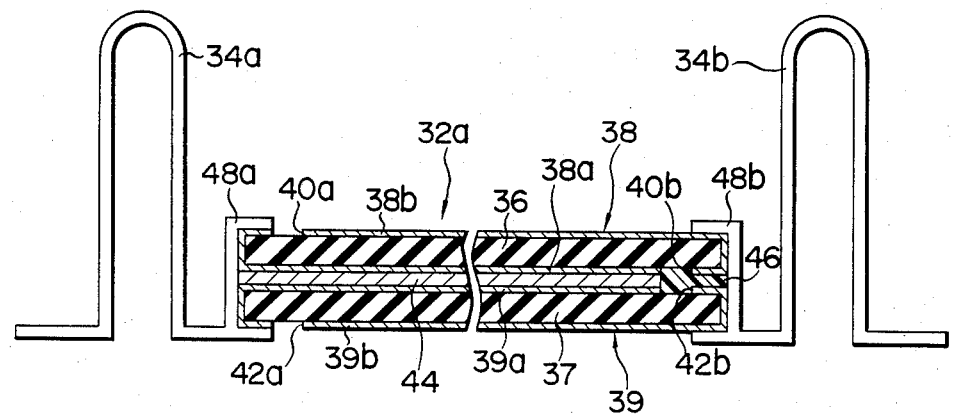
FIG. 2 is a sectional view of a vibrator sealed in the image sensing device of FIG. 1.

The construction of each vibrator with spring plates mounted thereon will now be described in detail having reference to FIG. 2. FIG. 2 illustrates one vibrator 32a having the spring plates 34a and 34b (not drawn to scale). Two piezoelectric substrates 36 and 37 comprise a ternary system piezoelectric ceramic material such as a PZT based piezoelectric material or a PbTiO$_3$-PbZrO$_3$-Pb(Co$_{y2}$W$_{y2}$)O$_3$ based piezoelectric material. Thin metal films 38 and 39 are formed to cover the entire surfaces of the substrates 36 and 37, respectively.

These thin metal films 38 and 39 are formed by Ni or Cu plating, baking using an Ag or Au paste, or deposition or sputtering of Ag, Al, Au, Ni or the like. In this embodiment, the metal films 38 and 39 were formed such that the PZT based material was coated with conductive paste No. 4510 available from Syoei Kagaku Kogyo KK and was dried and baked at a temperature of 700° C. Slit-like openings 40a and 40b are formed in the metal film 38 on the substrate 36, thereby producing two film components 38a and 38b which are electrically insulated from each other. Similarly, the metal film 39 has slit-like openings 42a and 42b so as to constitute film components 39a and 39b. The openings 40 and 42 are formed in the vicinities of the ends of the pixezoelectric elements so as not to impair the piezoelectric characteristics thereof. The substrates 36 and 37 are adhered together by a known adhesive 46 through a brass shim material 44 in such a manner that the openings 40a and 42a of the substrates 36 and 37 are exposed to the air.

The spring plates 34a and 34b have C-shaped holders 48a and 48b and are mounted to clamp end portions of the vibrator 32a, respectively. Therefore, the spring plate 34a is electrically connected to the metal film components 38a and 39a of the substrates 36 and 37, while the spring plate 34b is electrically connected to the metal film components 38b and 39b. When a voltage is applied to the principal surfaces of the substrates and a necessary bias voltage is applied, the vibrator 32a starts to vibrate. The CCD chip 10 is vibrated by the vibrators on a horizontal plane substantially perpendicular to an incoming image light, thereby performing the image pickup operation in such a manner as to periodically shift to different sampling positions at different time points in one frame period. For example, in a typical swinging image pickup mode, the CCD chip 10 is vibrated by the vibrators 32 at ½ the pitch (PH) of the horizontal pixels along the horizontal direction. According to this swinging image pickup technique, each pixel of the CCD chip 10 which consists of, for example, a photodiode swings between two different sampling positions spaced by PH/2 from each other and picks up the image light during one frame period. Therefore, a reproduced image having of pixels (i.e., resolution) substantially twice the actual pixel number of the CCD can be obtained.

Referring again to FIG. 1, the construction of the image sensing device will be further described. The CCD chip 10 is fixed on an insulative table plate 50 made of an epoxy-glass laminate. The table plate 50 has alignment holes 52a and 52b. Alignment pins 54a and 54b, integrally formed with the shim material 44 and extending from the vibrators 32 at the centers thereof, are fitted in the alignment holes 52a and 52b, respectively, when the CCD chip 10 is mounted on the frame 20.

Figure 3:
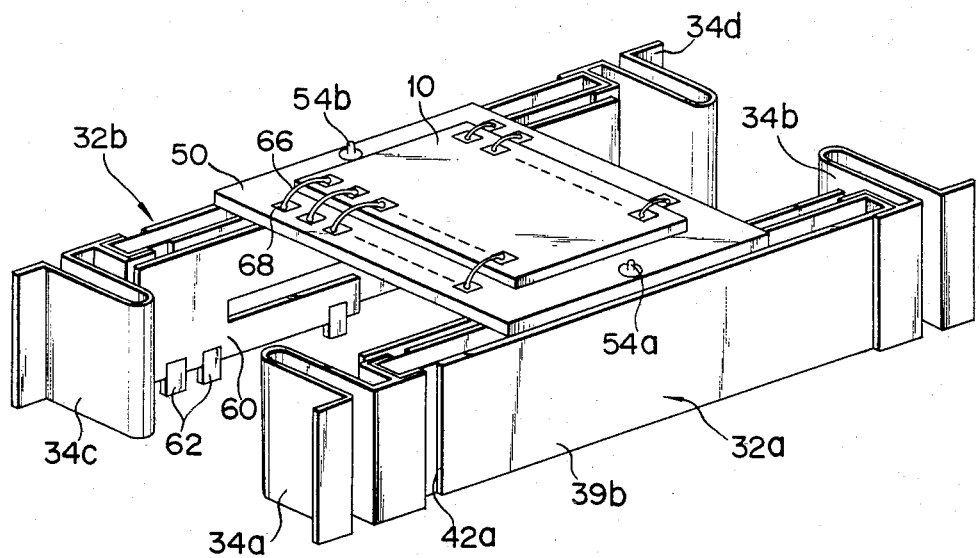
FIG. 3 is a perspective view illustrating the structure wherein the CCD chip is mounted together with film connectors on the two vibrators in the package shown in FIG. 1.

A flexible printed wiring sheet or film connector 60 is adhered to the rear surface of the table plate 50 on which the CCD 10 is mounted. The film connector 60 comprises a main body 60-1, a pair of C-shaped leg portions 60-2 and 60-3 connected at both sides of the main body 60-1, and a plurality of conductive connection portions 62 mounted on the C-shaped leg portions 60-2 and 60-3. A necessary number of wiring patterns 64 are formed on the C-shaped leg portions 60-2 and 60-3 following the C shapes. The CCD table plate 50 together with the film connector 60 is fixed on the opposing side surfaces of the pair of vibrators 32a and 32b. In this case, the C-shaped leg portions 60-2 and 60-3 of the film connector 60 are bent and connected by, for example, soldering to pins 26 (not all are illustrated in FIG. 1) connected to the lead terminals 24b, 24c, . . . excluding those connected to the lead terminals 24a and 24n for receiving the vibrator bias voltage. Therefore, the terminals (not shown in FIG. 1) of the CCD chip 10 are electrically connected to the lead terminals 24b, 24c, . . . (except for the vibrator power supply terminals 24a, 24n, etc.) through the film connector 60. This assembly construction is clearly illustrated in FIG. 3. Referring to FIG. 3, reference numeral 66 designates wires for bonding the CCD chip 10, and 68 designates a wiring pattern (extending on the rear surface thereof through through-holes) formed on the table plate 50.

The components prepared by the present inventors had the following dimensions. The solid-state image pickup device was an interline transfer type CCD (IT-CCD) having an area of $8 \times 10$ mm$^2$, the table plate 50 was an epoxy-glass printed circuit board having an area of $11 \times 14$ mm$^2$ and a thickness of 0.5 mm. Each bimorph piezoelectric element or vibrator 32a, 32b had a length of 23 mm, a width of 5 mm and a thickness of 0.1 mm. The ceramic frame 20 had slit ceramic plates each having a thickness of 2 mm and nonslit ceramic plates each having a thickness of 1 mm. The longer ceramic plates had a length of 31 mm and a width of 11 mm, and the shorter ceramic plates had a length of 17 mm and a width of 11 mm.

After the table plate 50 with the CCD 10, the flexible film connector 60 and the pair of vibrators 32 are mounted in the ceramic frame 20 in the manner described above, a transparent upper cover plate 70 and an insulative bottom cover plate 80 are fixed on the top and bottom openings of the frame 20.

According to the CCD package described above, the CCD 10 which shifts position and vibrates periodically relative to the image light through the transparent cover 70 so as to perform swinging image pickup for obtaining a plurality of sampling points within the one-field period can be highly precisely sealed together with the two vibrators 32a and 32b in a compact manner in accordance with an easy fabrication method. The table plate 50 with the CCD 10 thereon is mounted on the vibrators 32 such that the holes 52a and 52b are fitted around the alignment pins 54a and 54b of the vibrators 32a and 32b, thereby setting the CCD 10 at maximum vibration. The vibrators 32 elastically float in the ceramic frame 20 since the ends of the spring plates 34 are inserted in the corresponding slits 28. Therefore, the vibration amplitude obtained by the vibrations of the vibrators 32 can be maximized to approach a substantially ideal vibration amplitude. This is very suitable for vibrating a relatively heavy object (e.g., an object having a weight of 5 g) such as the CCD chip 10.

A more important effect is that the electrical connection between the CCD chip 10 and the vibrators 32 is improved (from the viewpoint of reliability and simplicity of the connecting process). After the CCD chip 10 is bonded by wires to the plate 50, no other lead wire need be used. The electrical connection between the CCD chip 10 and the lead terminals is performed by the flexible film connector 60. The electrical connection between the vibrators 32 and the lead wires is performed by soldering between the spring plates 34 and the metal wiring pattern 29 preformed on the ceramic frame 20. During the process for performing the above electrical connections, skilled setters are not required. Therefore, the manufacturing efficiency can be greatly improved with high reliability. Thus, a packaged CCD image sensing device for what is called the swinging image pickup can be handled as a single micro-chip device when it is used in a VTR camera or the like. This is because the input/output signal transmission of the CCD and the supply of the drive signal to the vibrators can be performed through the lead terminals 24 formed on the frame 20. In addition, the fact that the housing, incorporating the mechanically vibrating CCD 10 and consisting of the frame 20 and the covers 70 and 80, becomes compact contributes greatly to the ease of manufacturing compact photographic equipment such as cameras. Furthermore, the spring plates 34 also serve as the electrodes of the vibrators 32, so that the drive voltage can be properly applied to the vibrators without adverse effects on the vibration thereof. Due to this, the electrical connection will not be disconnected by the vibration of the vibrators.

A light-weight epoxy-glass board is used as the table plate for the CCD chip. In addition, the openings are formed on the flexible printed circuit boards to decrease the load of the bimorph piezoelectic elements. Thus, the resonant frequency becomes higher than the case wherein a ceramic table plate is used. According to an experimental model, a resonant frequency fell within the range between 300 and 400 Hz. This result indicates that the resonant frequency range for the solid-state image pickup device is so wide that the performance of the image pickup device can be easily improved.

Furthermore, since the frame has an open top and bottom and the top and bottom plates are mounted after the necessary components have been mounted, the assembly operation can be simplified.

Although the present invention has been shown and described with respect to a particular embodiment, various changes and modifications, which are obvious to a person skilled in the art to which the invention pertains, are deemed to lie within the spirit and scope of the invention.

What is claimed is:

1. An image sensing device comprising:
    solid-state image sensor means for receiving incoming image light to produce an electrical image pickup signal;
    swing-driver means for vibrating said image sensor means on a plane substantially perpendicular to the image light and for causing said image sensor means to perform an image pickup operation in such a manner that said image sensor means periodically shifts to different sampling positions at different time periods in one frame period with said swing-driver means comprising a pair of plate-like piezoelectric elements which face each other and stably support said image sensor means on facing side surfaces thereof;
    package means for sealing said image sensor means and said piezoelectric elements, said package means comprising,
    elastic support means for elastically mounting said piezoelectric elements in said package means and hence allowing swinging of said piezoelectric elements at a minimum vibration loss, said elastic support means being electrically conductive and connected with said pair of piezoelectric elements to serve as electrodes for supplying a drive voltage to said piezoelectric elements.

2. The device according to claim 1, wherein said package means further comprises:

an electrically insulative rectangular frame body which has first lead terminals for transferring input/output signals to/from said image sensor means, and second lead terminals for receiving a drive power supply voltage for said piezoelectric elements and which has an open top and an open bottom, said frame having facing wall portions which have two pairs of slits and wiring patterns for electrically connecting said two pairs of slits and said second lead terminals, said elastic support means being inserted at the ends thereof into said two pairs of slits, respectively, thereby elastically mounting said piezoelectric elements in said frame body, and sealing plates which are respectively brought into tight contact with openings of said frame body so as to seal said image sensor means and said piezoelectric elements in said frame body.

3. The device according to claim 2, further comprising:
(d) a flexible printed wiring board adhered to a rear surface of said image sensor means, sealed in said frame, and electrically connected to said first lead terminals and said image sensor means; and
(e) aligning means for solely determining alignment positions of said image sensor means on said piezoelectric elements.

4. The device according to claim 3, wherein said aligning means comprises:
a table plate member mounted on said rear surface of said image sensor means and having holes outside said image sensor means; and
projection members formed at substantially central portions of said piezoelectric elements so as to correspond to said holes, respectively, whereby when said table plate member is mounted on said piezoelectric elements such that said holes formed in said table plate member for fixing said image sensor means are respectively fitted around said projection members, said image sensor means is aligned with said piezoelectric elements.

5. The device according to claim 4, wherein said sealing plates include a transparent plate which is attached to the upper opening of said frame body and through which the incoming image light is introduced onto said image sensor means.

6. The device according to claim 5, wherein each of said piezoelectric elements comprises:
two adhered bimorph piezoelectric substrates which are formed in a rectangular plate shape having first and second edge portions;
first electrode means attached to the first edge portion of said two adhered bimorph piezoelectric substrates, connected in common to first principal surfaces as exposed outer surfaces of said two adhered bimorph piezoelectric substrates and extending from the first edge portion of said bimorph substrates along a longitudinal direction thereof; and
second electrode means attached to the second edge portion of said bimorph piezoelectric substrates, connected in common to second principal surfaces as inner surfaces of said two adhered bimorph piezoelectric substrates and extending from the second edge portion of said bimorph substrates along the longitudinal direction thereof.

7. The device according to claim 6 wherein said elastic support means comprises:
first metallic plates, mechanically and electrically coupled with said first and second electrode means provided for one piezoelectric element, for being fitted in one of said two pairs of slits formed in said frame, thereby elastically supporting said one piezoelectric element; and
second metallic spring plates, mechanically and electrically coupled with said first and second electrode means provided for the other piezoelectric element, for being fitted in the other of said two pairs of slits formed in said frame, thereby elastically supporting the other piezoelectric element.

* * * * *